Aug. 26, 1969 R. F. WENZLER 3,463,358
MATERIAL SPREADER MEANS

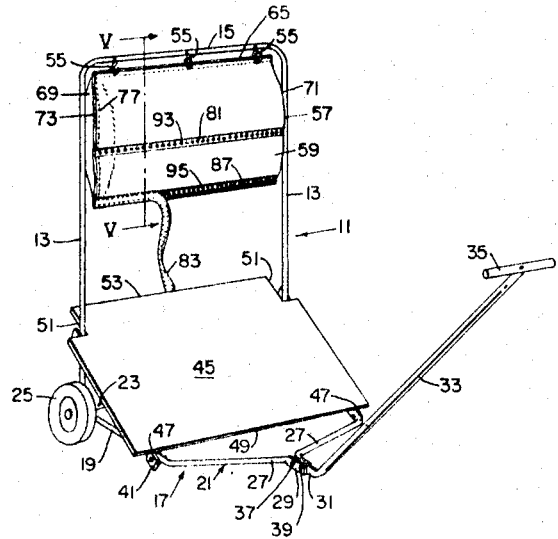

Filed Jan. 11, 1968 2 Sheets-Sheet 2

INVENTOR,
ROY F. WENZLER
BY
Weatherford & Weatherford
attys

United States Patent Office 3,463,358
Patented Aug. 26, 1969

3,463,358
MATERIAL SPREADER MEANS
Roy F. Wenzler, 936 Hiawatha St.,
Memphis, Tenn. 38117
Filed Jan. 11, 1968, Ser. No. 697,053
Int. Cl. B65d 37/00
U.S. Cl. 222—105                                      4 Claims

ABSTRACT OF THE DISCLOSURE

An apparatus for dispensing comminuted material such as fertilizer, including a rollable cart adapted to support a bag-like container having a pair of nested bags containing the material; the inner bag having two rows of perforations alined under slots in the outer bag, with removable tear strips carried by the outer bag over the slots, and a deflector carried by the cart below the bags to spread the material over a selected area.

BACKGROUND OF THE INVENTION

Field of the invention

The present invention relates to means for dispersing and spreading comminuted materials such as fertilizers, grass seed, plant food, and more particularly to manually operable mechanical means for applying comminuted materials to lawns and similar grassy areas.

The present invention additionally relates to material containers having selectively spaced apertures, and means for sealing and unsealing these apertures, for use in combination with the means for spreading comminuted materials.

Description of the prior art

There have been numerous prior devices for spreading and dispersing fertilizers and other comminuted materials, but these prior devices have been designed to provide hoppers to carry the fertilizer pursant to the removal of the fertilizer from its original container. These prior devices have further been provided with screws, fins and similar mechanical devices to remove the fertilizer from the hopper for distribution to the earth therebelow.

A search of the prior art disclosed the following references: 3,080,098, Fierman, Mar. 5, 1963; 3,107,822, Regenstein, Oct. 22, 1963; 3,113,702, Luedtke, Dec. 10, 1963; 3,152,732 Schulman et al., Oct. 13, 1964; 3,179,298, Collins, Apr. 20, 1965; 3,207,379, Waldrum, Sept. 21, 1965.

Field of the search was: Class 222, sub-classes 160, 176 and 177.

SUMMARY OF THE INVENTION

Unlike the devices disclosed in the prior art, the present invention provides means for utilizing a modified disposable fertilizer container in combination with means for distributing the fertilizer over a desired area. The present invention further provides cart-like means for supporting the fertilizer container during storage and in use and means provided by the cart-like means for omnidirectionally distributing the fertilizer from the container to the lawn and therebelow.

The present invention additionally comprises fertilizer container means provided with means for permitting the user thereof to discharge a portion of the fertilizer and retain the remainder of the fertilizer for future distribution.

OBJECTS OF THE INVENTION

The principal object of the present invention is to provide means for distributing dry, comminuted materials such as fertilizer or the like.

Another object of the present invention is to provide means for distributing comminuted materials such as fertilizers and the like, comprising cart-like means and fertilizer container means carried thereby.

A further object of the present invention is to provide a dual bag container for fertilizers or the like.

Another object of the present invention is to provide a dual bag fertilizer container having an internally nested bag provided with a plurality of series of like perforations.

A further object of the present invention is to provide a dual bag fertilizer container having an outer bag provided with strip covered slots in registry with the perforations defined in the inner bag nested therein.

Another object of the present invention is to provide a dual bag fertilizer container having apertured means for suspendable attachment to the frame of a cart-like means for transporting the fertilizer container.

A further object of the present invention is to provide a fertilizer dispensing means comprising a fertilizer container carried by a cart-like means having a deflector mounted thereupon to deflect and distribute the fertilizer discharged from the fertilizer container affixed to the cart-like means above the deflector; and Another object of the present invention is to generally improve the design, construction and efficiency of material spreader means.

DESCRIPTION OF THE DRAWINGS

The means by which the foregoing and other objects of the present invention are accomplished and the manner of their accomplishment will be readily understood from the following specification upon reference to the drawings, in which:

FIG. 1 is a perspective view of the device of the present invention, including the container and a cart therefor FIG. 2 is a side elevational view of the device of FIG. 1 with part broken away for illustration.

FIG. 3 is a top plan view of the cart device.

FIG. 4 is an enlarged fragmentary vertical cross-sectional view of the device of FIG. 2, as taken on the line IV—IV of FIG. 3.

FIG. 5 is an enlarged fragmentary cross sectional view of the device of FIG. 1 as taken on the line V—V of FIG. 1.

DESCRIPTION OF THE PREFERRED EMBODIMENT

Figure 6:
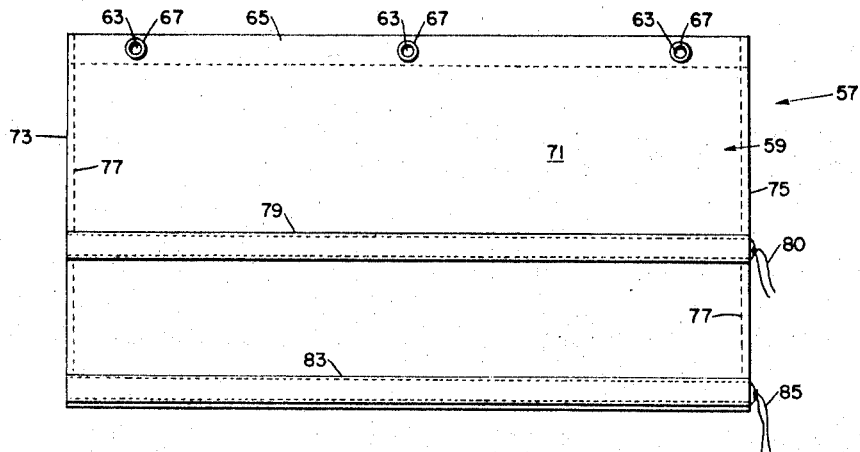
FIG. 6 is an enlarged front elevational view of the container of the device of FIG. 1.
Figure 7:
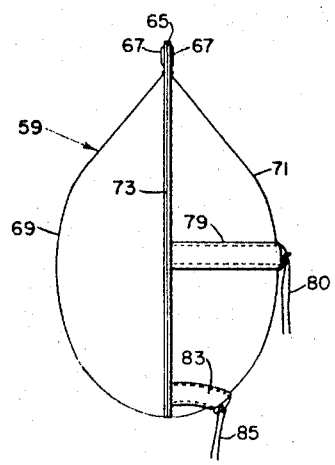
FIG. 7 is a side elevational view of the device of FIG. 6.
Figure 8:
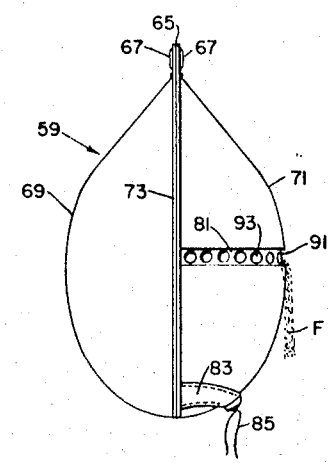
FIG. 8 is a side elevational view of the device of FIG. 6 with the upper tear strip removed therefrom.
Figure 9:
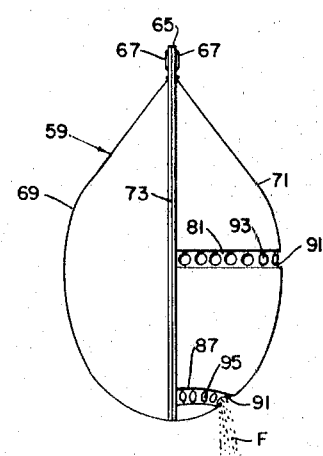
FIG. 9 is a side elevational view of the device of FIG. 6 with the upper and lower tear strips removed therefrom.

Referring now to the drawings in which the various parts are indicated by numerals, the present invention includes a cart 11 comprising a pair of substantially upright, spaced apart, rod members 13, brace means 15 attached to and spanning between the uppermost ends of the rod members 13, a substantially U-shaped base frame 17 attached to the lowermost ends of the rod members 13, extending angularly outwardly therefrom, the base frame 17 including leg members 19 and a bight portion 21 connected to the leg members 19 at their outer ends. The cart 11 is further provided with an elongated axle 23 spanning between and carried by the lowermost ends of the upright rods 13 and extending oppositely outwardly beyond the rods. The axle 23 is provided with a pair of longitudinally oppositely spaced wheels 25 rotatably mounted thereupon outwardly of the lowermost ends of the upright rods 13 and the adjacent distal ends of the base frame legs 17.

The base frame bight 21 comprises a pair of substantially cylindrical members 27 integrally attached to the rearward ends of the base frame legs 19 and extend inwardly therefrom into connection with a pair of angularly rearwardly disposed flattened end portions 29. The rearwardly disposed end portions 29 are maintained in substantial spaced relation by the interposition therebetween of the flattened end 31 of the handle 33. The handle 33 extends angularly upwardly from the end 31 and is provided with a handle pull member 35 attached to the upper end thereof. The flattened handle end 31 and the ends 29 of the bight members 27 are disengageably connected as by the bolt means 37, 39 to facilitate the removal of the handle 33 from the cart-like means 11 for purposes of storage when the device is not in use.

The cart 11 is further provided with a pair of oppositely spaced links 41 attached at one of their ends to the upright rods 13 as by the bolts 43, somewhat above the lowermost ends of the upright rods and depending rearwardly angularly downwardly therefrom into bolted attachment at their opposite ends with the rearmost portions of the base frame legs 19, to provide platform means thereby for a substantially rectangularly defined deflector 45. The links 41 are provided with notches 47 formed in the upper surface thereof and spaced somewhat forwardly of the rearmost ends of the links 41.

It will be readily seen upon reference to the drawings, and more particularly to FIGS. 1 and 4 of the drawings, that portions of the leading edge 49 of the deflector 45 bear against the notches 47 to hold the deflector 45 substantially stable thereagainst and prevent the movement of the deflector 45 downwardly across the links 41. The deflector 45 is additionally provided with a pair of longitudinally oppositely spaced cut outs 51 formed in the ends of the trailing edge 53 of the deflector 45. The trailing edge 53 of the deflector 45 extends rearwardly beyond the upright rods 13 of the cart 11 to form a shelf-like portion contained within the upright rods 13 to restrain the deflector 45 from moving laterally away from the cart 11 and the links 41.

The upper brace 15 of the cart means 11 is provided with a plurality of hooks 55 rigidly attached thereto and in spaced longitudinal alinement therealong.

The present invention additionally provides a bag-like material container 57 including an outer envelope 59 and an inner envelope 61 snugly nested within the outer envelope 59. The outer envelope 59 is provided with a plurality of apertures 63 formed in spaced alinement along the upper flap portion 65 thereof, reenforced by grommets 67 or similar aperture reenforcing means. It will thus be readily seen upon reference to FIG. 1 of the drawings that the container 57 is swingably affixed to the cart means 11 by engaging the apertures 63 thereof with the hooks 55 carried by the brace 13 of the cart 11.

The outer envelope 59 of the container additionally comprises a front panel 69, a rear panel 71, and a pair of oppositely spaced end sections 73, 75 suitably connected as by the stitching 77, to form a substantially bag-like container. The rear panel 71 of the outer envelope 59 is provided with a tear strip 79, substantially coextensive in length with the panel 71, in overlying adjacency therewith somewhat below the longitudinal axis thereof releasably attached to the outer surface of the panel 71 as by the thread means 80. The thread means 80 are affixed to the tear strip 78 and the underlying panel 71 preferably by a loop-stitch provided with means for easy removal of the thread means 80 therefrom to disengage the tear strip 79 from the panel 71, and expose the longitudinal slot 81 formed in the panel 71 rearwardly adjacent the tear strip 79. The panel 71 is additionally provided with a second tear strip 83, substantially in spaced parallel alinement with the tear strip 79 releasably attached to the panel 71 somewhat above the bottom thereof as by the thread means 85. The tear strip 83 is further positioned in overlying adjacency with the transverse slot 87 formed in the panel 71 of the outer envelope 59.

The inner envelope 61 comprises a front panel 89 and a rear panel 91 peripherally attached thereto to form a bag-like container similar to the outer envelope 59. The rear panel 91 of the inner envelope 61 is provided with a series of transversely alined apertures 93, formed in the panel 91 somewhat below the longitudinal axis thereof and positioned rearwardly in register with the transverse slot 81 of the panel 71 of the outer envelope 59. The panel 91 is additionally provided with a second series of apertures 95 substantially in parallel alinement with the series of apertures 93 and positioned therebelow somewhat above the bottom of the panel 91, in register with slot 87.

In the use of the device, the container 57 filled with a desired comminuted material F such as fertilizer, seed or the like, is mounted on the hooks 55 of the cart 11 by positioning grommets 65 upon the hooks, with the panel 71 of the envelope 59 positioned above the deflector 45. The upper tear strip 79 is separated from the panel 71 by disengaging and removing the attachment means such as thread 80 therefrom. The material F discharges through the apertures 93 and the adjacent slot 81 and drops by gravity to the deflector 45 therebelow to be deflected outwardly and downwardly therefrom to the ground. After a selected area has been covered by the material F discharged through the apertures 93, the cart 11 and the container 57 attached thereto may be stored for further use. If it is desired to cover a substantially large area or utilize the device subsequent to the storage thereof, the tear strip 83 is removed from the envelope 59 by disengaging the attachment means such as thread 85 therefrom to expose slot 87 thereunder and the series of apertures 95 formed in the panel 91, to achieve discharge of the material F outwardly from the inner envelope 61 through the apertures 95 and the slot 87 downwardly into contact with the deflector 45 and therebeyond the ground.

I claim:

1. Means for distributing comminuted materials comprising;
(A) a rollable cart comprising a horizontal frame means, another frame means connected to one end of the horizontal frame means and extending vertically therefrom, wheels journaled at the connection between the frames, an operating handle connected to the other end of the horizontal frame and extending upwardly therefrom, brace connecting the frames medially thereof, a container carrying said comminuted materials, means to attach the container to the upper portion of the vertically extending frame, a material deflector supported by the brace members and positioned below the bottom of the container for receiving and deflecting the material discharged from the container,
(B) said container including a pair of envelopes in nested relation,
  (1) the inner envelope of said pair of envelopes provided with a plurality of series of perforations formed in one of the panels thereof,
  (2) the outer envelope of said pair of envelopes provided with a plurality of elongated slots formed in one of the panels thereof in overlying registry with the plurality of series of perforations of said inner envelope,
  (3) the outer envelope of said pair of envelopes provided with releasable strip means sealingly overlying said plurality of elongated slots,
(C) means for disengaging said strip means from said outer envelope to allow the discharge of the comminuted material in said inner envelope through said series of perforations and said elongated slots of said outer envelope.

2. Means in accordance with claim 1, wherein one of said series of perforations is formed in one of the panels of said inner envelope somewhat below the center of said panel in substantial alinement with the longitudinal axis of said panel of said inner envelope.

3. Means in accordance with claim 1, wherein the other of the said series of perforations is formed in said panel of said inner envelope somewhat above the bottom of said panel in longitudinal alinement therewith.

4. Means in accordance with claim 1, wherein said releasable strips may be removed from said outer envelope singly to selectively apportion the discharge of the comminuted material from said inner envelope of said container through said perforations and said slots outwardly therefrom.

References Cited

UNITED STATES PATENTS

| | | | |
|---|---|---|---|
| 2,538,413 | 1/1951 | Chard | 222—176 X |
| 2,663,461 | 12/1953 | Brown | 222—107 |
| 2,956,486 | 10/1960 | Siegle | 222—176 X |
| 2,974,963 | 3/1961 | McBride | 222—178 X |
| 3,028,986 | 4/1962 | Cushman | 222—107 X |
| 3,159,096 | 12/1964 | Tocker | 222—107 X |
| 3,173,580 | 3/1965 | Campbell | 222—107 |
| 3,182,728 | 5/1965 | Zabriskie | 222—107 X |
| 3,246,803 | 4/1966 | Laub | 222—107 |
| 3,369,709 | 2/1968 | Clauss | 222—107 |

WALTER SOBIN, Primary Examiner

U.S. Cl. X.R.

222—107, 176, 485, 541